C. E. COLE.
DOUBLETREE BRAKE.
APPLICATION FILED JUNE 1, 1914.
1,113,755.
Patented Oct. 13, 1914.
2 SHEETS—SHEET 1.
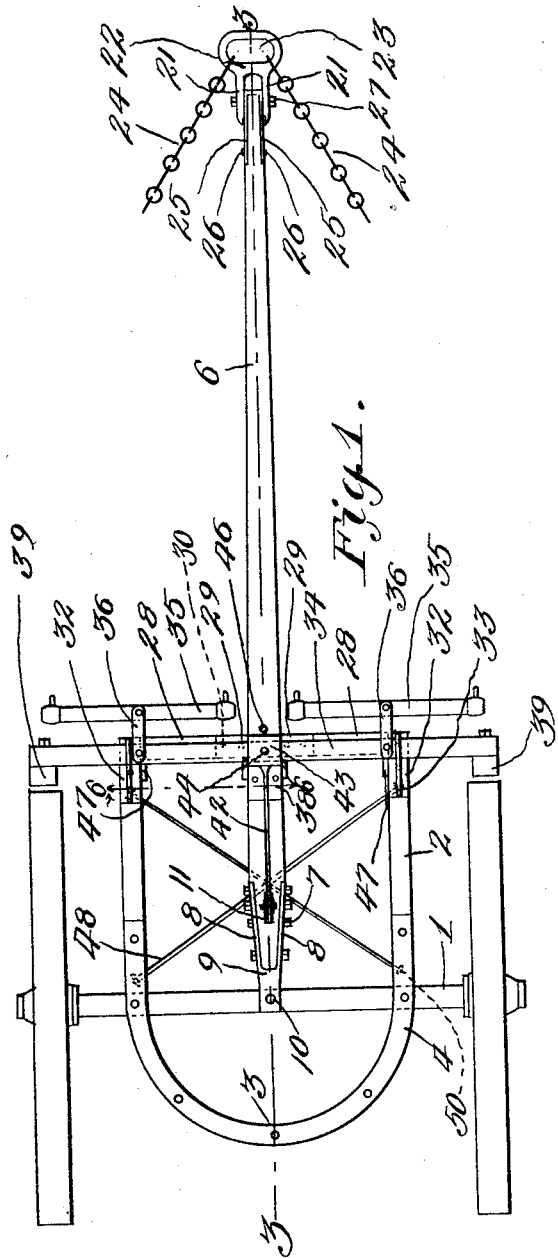
Witnesses
Philip Terrell
Francis J. Coswell
Inventor
C. E. Cole
By D. Swift &c.
his Attorneys

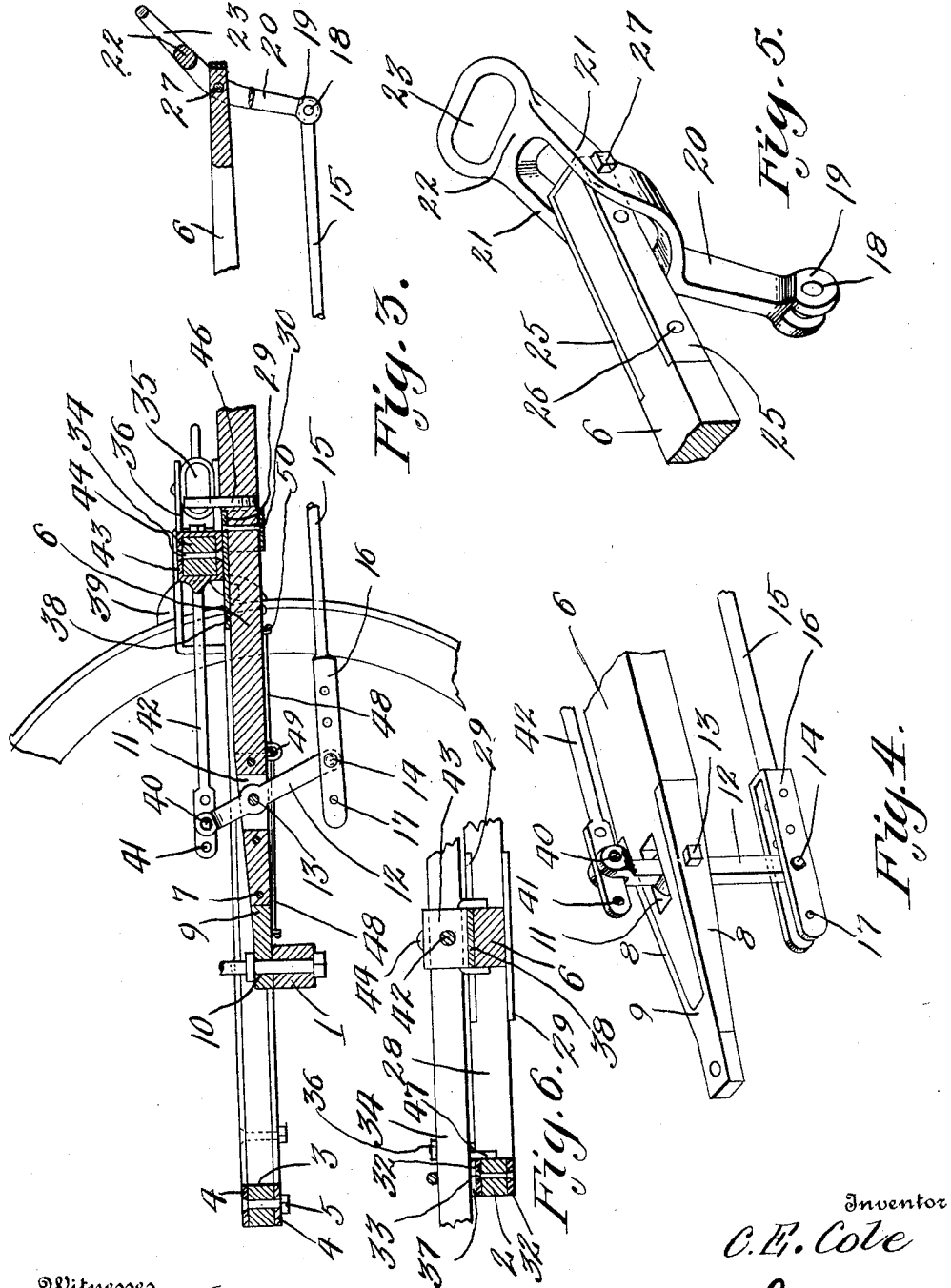

UNITED STATES PATENT OFFICE.

CLEMENT E. COLE, OF FLOYD, VIRGINIA.

DOUBLETREE-BRAKE.

1,113,755.  Specification of Letters Patent.  Patented Oct. 13, 1914.

Application filed June 1, 1914. Serial No. 842,202.

*To all whom it may concern:*

Be it known that I, CLEMENT E. COLE, a citizen of the United States, residing at Floyd, in the county of Floyd and State of Virginia, have invented a new and useful Doubletree-Brake; and I do hereby declare the following to be a full, clear, and exact description of the invention, such as will enable others skilled in the art to which it appertains to make and use the same.

This invention relates to an improved wagon brake, and particularly to that type of brake in which the double-tree is utilized as the brake beam carrying the usual brake shoes.

An object of the invention is the provision of a brake mechanism of this character, especially adapted for applying the brake shoes when the wagon is moving down grade, or when the draft animals are pulling back upon the neck yoke of the wagon pole, and when the wagon is proceeding or moving on a level grade or the draft animals pulling forward on the double-tree, the brake shoes are released. However, in either case the action is positive.

In practical fields the details of construction may be subjected to alterations, falling within the scope of what is claimed.

The invention comprises further features and combination of parts, as hereinafter set forth, shown in the drawings and claimed.

In the drawings:—Figure 1 is a plan view of the forward running gear of a wagon, showing the improved brake mechanism as applied in accordance with the invention. Fig. 2 is a side elevation illustrating the double-tree which is used as a brake beam, with the brake shoes out of engagement with the forward wheels. Fig. 3 is a sectional view on line 3—3 of Fig. 1, showing the brake shoes applied in contact with the forward wheels. Fig. 4 is an enlarged detail perspective view of the rear end of the wagon tongue showing a portion of the mechanism. Fig. 5 is an enlarged detail perspective view of the forward end of the wagon tongue. Fig. 6 is a sectional view on line 6—6 of Fig. 1.

Referring more especially to the drawings, 1 designates the forward axle, on which the usual wood hounds 2 are arranged. The hounds 2 merge together in the rear into one curved piece 3, reinforced above and below by the plates 4 bolted in place at 5.

The usual wagon tongue or pole 6 is provided, and secured to the pole upon its sides adjacent the rear portion thereof, by means of bolts 7 are metal plates 8, the rear portions of which merge toward each other and are welded together as at 9, which welded portion is secured at 10 to the axle 1, as shown in Fig. 1. Between this welded portion and the rear extreme end of the wagon pole or tongue a space 11 is provided, in which a lever 12 is arranged, being pivoted at 13 to said plates 8. Pivoted at the lower end of the lever 12 as at 14 is a rod 15, which has a forked end 16 provided with a plurality of perforations 17. The pivot bolt 14 is designed to enter any two registering apertures 17, so as to adjustably connect the rod 15 to said lever 12. The forward end of the rod is pivoted at 18 to the bifurcated end 19 of the lever 20. This lever comprises two plates 21, which merge together at 22 and terminate in an integral eye 23, which may either receive the usual tongue or neck yoke (not shown) or the tongue chains 24. The forward end of the tongue 6 has the usual pole tip or side reinforcing plates 25 secured at 26, also through which the pivot bolt 27 of the lever 20 extends.

Brace members 28 project from the sides of the pole or tongue, there being reinforcing plates 29 above and below secured at 30, to brace and reinforce the members 28. The outer ends of the members 28 abut against the forward ends of the hounds 2, being connected and reinforced and braced relative to the hounds by the plates 32 above and below secured in place as at 33. The usual double-tree 34 is provided having the conventional form of swingle-trees 35 connected at 36 to the double-tree by means of a hinge or pivotal joint, as shown, so as to prevent downward sagging of the swingle-tree, that is, prevent the swingle-trees from dropping in front of the brace members 28. The under face of the double-tree is provided with a wear plate 37, the central portion of which slides upon a rearward central extension plate of one of the plates 29, which rear extension plate is designated by the numeral 38. The outer end portions of the wear plate 37 slide upon the upper bracing plate 32 which also constitutes a wear plate, thereby preventing wear upon the wood hounds and the wood double-tree. The outer ends of the double-tree (which constitutes a brake beam) are provided with the usual brake shoes 39, designed to contact with the forward wheels, to retard the action of the wagon upon moving down grade. A pivot bolt 40 is designed to pass through the upper bifurcated end of the lever 12 and adapted to enter any one of the apertures 41 of the rear end of the connecting bar 42, thereby adjustably connecting the bar to the lever 12. This bar 42 has its forward end portion terminating in a loop 43, through which the double-tree extends, the same being firmly and rigidly fastened to the loop by the bolts 44, so as to prevent oscillation of the double-tree or brake beam. To further prevent undue oscillation of the brake beam or double-tree the loop is provided with a pair of downwardly extending lugs, one engaging each side of the wagon pole or tongue, so as to insure guiding the brake beam or double-tree in its movements. When the draft animals are pulling the double-tree or brake beam, thereby releasing the brake shoes, excess movement of the brake beam or double-tree is prevented, owing to the upwardly extending pin or bolt 46 of the wagon pole. As a further assistance in guiding and preventing undue oscillation of the double-tree or brake beam, the wear plate 37 is provided with downwardly extending lugs 47 to engage the inner side faces of the hounds 2. Reinforcing rods 48 intersecting one another are provided, the intersecting portions of which are secured at 49 to the rear portion of the wagon pole or tongue, while their outer ends are secured at 50 to the hounds and the axle 1, as shown, thereby bracing and reinforcing the entire structure.

The draft animals upon pulling the wagon on a level grade or up hill pull upon the double-tree or brake beam in the usual manner, in which case the brake shoes 39 are not applied, and at the same time the lower rear end of the lever 20 is pulled rearwardly. However, upon going down grade the draft animals pull upon the forward end of the lever 20, which in turn pulls upon the rod 15, thereby oscillating the lever 12 pulling upon the bar 42 in a rearwardly direction, thereby throwing the brake beam or double-tree rearwardly, causing the shoes to forcefully and firmly contact with the forward wheels of the vehicle, thereby retarding the vehicle.

The invention having been set forth, what is claimed as new and useful is:—

In combination with the hounds of the forward running gear of the vehicle, a wagon tongue connected to the axle of the running gear, means bracing the hounds and the tongue relative to each other, a pair of reinforcing plates upon opposite sides of the rear portion of the tongue, a lever pivoted between said plates, a double-tree brake beam on the tongue and provided with brake shoes, a bar adjustably connecting the upper end of said lever and having a looped end engaging said brake beam, devices carried by the brake beam engaging the opposite sides of the tongue for guiding the beam and to guard against undue oscillation thereof, lugs extending down from the brake beam engaging the inner faces of the hounds to guard against undue oscillation of the beam as well as guiding the same, a second lever pivoted to the forward end of the tongue, and a rod connection adjustably connecting the lower ends of the first and second levers.

In testimony whereof I have signed my name to this specification in the presence of two subscribing witnesses.

CLEMENT E. COLE.

Witnesses:
W. A. Sowers,
P. H. Dickerson.

---

Copies of this patent may be obtained for five cents each, by addressing the "Commissioner of Patents, Washington, D. C."